UNITED STATES PATENT OFFICE.

HORACE WILLIAMS AND JOHN L. ALBERGER, OF BUFFALO, NEW YORK.

METHOD OF OR PROCESS FOR MANUFACTURING GLUCOSE FROM GRAIN.

SPECIFICATION forming part of Letters Patent No. 246,262, dated August 23, 1881.

Application filed October 28, 1880. (No specimens.)

*To all whom it may concern:*

Be it known that we, HORACE WILLIAMS and JOHN L. ALBERGER, of Buffalo, county of Erie, and State of New York, have jointly invented a certain new and useful Method or Process of Manufacturing Glucose from Grain, of which the following is a description, in such full, clear, concise, and exact terms as to enable any one skilled in the arts to which it appertains or with which it is most nearly connected to practice the same.

Our invention consists of the following process of treating corn to produce glucose and animal food, viz:

First. Grind the corn and bolt out about six pounds of hulls or coarse bran to the bushel of corn.

Second. Make a mash of the meal in a solution of sulphuric acid and hot water in the proportion of about two ounces of the acid, (1.66 Baumé,) eighteen to twenty gallons of water, and fifty pounds of meal. Thoroughly stir or mix this mash and steam or cook it in a suitable vessel, under about forty pounds of steam-pressure, until the starch of the meal is all converted into soluble dextrine, and until the gluten and albumen coagulate and separate from the solution of dextrine and water, leaving the latter in a condition to run freely through a filter of any suitable construction.

Third. Separate the solution of soluble dextrine, acid, and water from the refuse, husk, gluten, albumen, oil, &c., by straining it through any suitable filtering apparatus.

Fourth. Add about ten (10) ounces of sulphuric acid of 1.66 per cent. Baumé to the filtered solution of dextrine, water, and acid, and apply heat—say forty pounds of steam—until the dextrine is converted into sugar or sirup.

Fifth. Add about three-quarters of a pound of marble-dust to neutralize the acid, and filter out the neutralized residuum; then bone-black the sirup, and boil it in a vacuum-pan to about 40° Baumé. The result will be a sirup of superior sweetness, purity, and color.

Sixth. Treat the residuum, consisting of the coagulated gluten, albumen, and all the husk and all fibrous matter, with a weak solution of hot water and alkali sufficient to neutralize the acid remaining in it and wash out the soluble dextrine. By this treatment of the refuse we obtain a highly nutritious and wholesome food for animals, and thoroughly wash out all the sugar-producing elements of the grain, adding the wash-water to the solution of soluble dextrine and water previous to its conversion into sugar or sirup.

The distinguishing features of our process are these: We obtain from the meal, by means of heat, acid, and water, a solution of soluble dextrine, water, and acid. In the first instance, instead of starch, as by the old process, we avoid saccharification in the mash by using only a small percentage of acid, only sufficient to quicken the production of soluble dextrine and the coagulation of the gluten and albumen, but not enough to convert the dextrine or to free or separate the oil in the refuse, as in the high-pressure process, where the saccharification and coagulation take place in the mash before filtration. We divide the acid necessary for saccharification in two parts, and use it at different times in the process. Thus we use a small part of it to obtain the soluble-dextrine solution and the coagulation before filtration, and the remainder to convert the dextrine into sugar after filtration, thus obtaining the advantage of the acid in the first step and avoiding its disadvantages, while at the same time we use no more for the saccharification than would be necessary if it were all added at once, either before or after filtration, as in the old processes. We filter and wash the refuse before saccharificating, thus separating all the sugar-producing elements from all the refuse, adding the acid necessary for its conversion into sugar, leaving the refuse unaffected by the acid used in the final conversion, with all its gluten, albumen, and oil intact, and a wholesome and nutritious food for animals, by merely neutralizing with a very weak solution of alkali and water the small percentage of acid used in the first instance to obtain the soluble dextrine from the grain.

As a substitute for sulphuric acid in the first instance, to obtain the solution of soluble dextrine one pound of acetic acid to every bushel of corn may be used; or the mash may be allowed to stand at a temperature of 70° Fahrenheit until acid-fermentation ensues; but we prefer the use of sulphuric acid, as above described.

In concluding this specification, we observe that we are aware that attempts have been made to produce sugar and sirup from corn-meal by exposing the mash under heat and pressure to the action of sulphuric acid to convert in one operation the starch into dextrine and the dextrine into sugar or sirup, and at the same time to coagulate the gluten and albumen and expose the refuse of the grain to the action of the acid, heat, and pressure. To this process we lay no claim. It is quick, but very objectionable, in that the heat, acids, and pressure upon the refuse liberate the oil and make new compounds, give the sugar a bad taste, and discolor it to such a degree that it is impossible to eliminate the coloring-matter; and, moreover, it wastes the residuum, which, by our process, is saved and turned into a valuable product. Nor do we lay any claim to subjecting corn or grain entire with water in a close vessel to slow stirring and the effect of steam under pressure, by which the substance of the corn is entirely disintegrated, forming a homogeneous soup or pasty mass, leaving the husk or skins intact, to be removed from the disintegrated parts by blowing or forcing the mass through suitable sieves or strainers, on which the hulls remain while the rest passes through the meshes. This is not the kind of mash or solution we make in the first instance, but a thin solution of soluble dextrine, acid, and water that runs through the filter like water, leaving the refuse, coagulated gluten, and albumen behind. The great advantage and novelty of our process appear in the result, for by the process of manufacturing glucose now in use only thirty pounds of sirup or sugar is produced per bushel, while by our process forty-five pounds of sirup or sugar of equal density and sweetness are produced to the bushel of grain.

What we claim, therefore, is—

1. The following process of manufacturing glucose from grain, viz: first, cooking the meal under steam-pressure in a solution of acid and water just strong enough to quickly convert the sugar-producing elements of the grain into soluble dextrine and to coagulate the gluten and albumen, but not strong enough to convert the dextrine into sugar; second, filtering the solution thus obtained for the purpose of separating from it the gluten, albumen, and fibrous matter of the grain; third, increasing the acid in the filtered solution and raising the temperature thereof until saccharification ensues.

2. The following process of making animal-food from the refuse of the grain used in manufacturing glucose: first, filtering the coagulated gluten, albumen, and fibrinous matter from the primary solution of soluble dextrine, acid, and water; second, treating the gluten, albumen, and fibrine thus obtained with a weak solution of alkali and water for the purpose of neutralizing the acid; third, washing the gluten, albumen, and fibrine with hot water for the purpose of cleaning and purifying them.

3. The new article of manufacture consisting of animal-food composed of the cleansed or purified gluten, albumen, and fibrine, constituting the refuse of the grain used in the manufacture of glucose.

HORACE WILLIAMS.
JOHN L. ALBERGER.

Witnesses:
F. S. MILLER, Jr.,
C. Y. SELLECK.